United States Patent [19]
Green et al.

[11] Patent Number: 6,118,208
[45] Date of Patent: Sep. 12, 2000

[54] FILM TENSIONING APPARATUS

[75] Inventors: Jon Milton Green, Mountville; David James Fabian, Mount Joy, both of Pa.

[73] Assignee: The Whitaker Corporation, Wilmington, Del.

[21] Appl. No.: 09/105,707

[22] Filed: Jun. 26, 1998

[51] Int. Cl.[7] .................................................. H01L 41/08
[52] U.S. Cl. ........................................... 310/338; 310/311
[58] Field of Search .................................... 310/311, 800, 310/338, 339

[56] References Cited

U.S. PATENT DOCUMENTS

| | | | |
|---|---|---|---|
| 5,624,132 | 4/1997 | Blackburn et al. | 280/735 |
| 5,904,654 | 5/1999 | Wohltmann et al. | 600/481 |
| 5,915,932 | 6/1999 | Nabity et al. | 417/477.1 |

Primary Examiner—Thomas M. Dougherty
Attorney, Agent, or Firm—Michael Aronoff

[57] ABSTRACT

An acoustic or vibration sensor particularly useful in detecting nano-vibrations includes a body 40 having a generally C-shaped cross-sectional configuration. A base 44 is positioned within the body 40 and has at least one protrusion 68 extending from the base 44 intermediate end portions 48 of the C-shaped cross-section. A film 14 extends about the base 44 and over the protrusion 68 to form a space between a portion of the base 44 and the film 14. The film 14 is engaged with the end portions 48 of the C-shaped cross-section and urged at least partially into the space to place a desired tension on the film.

23 Claims, 7 Drawing Sheets

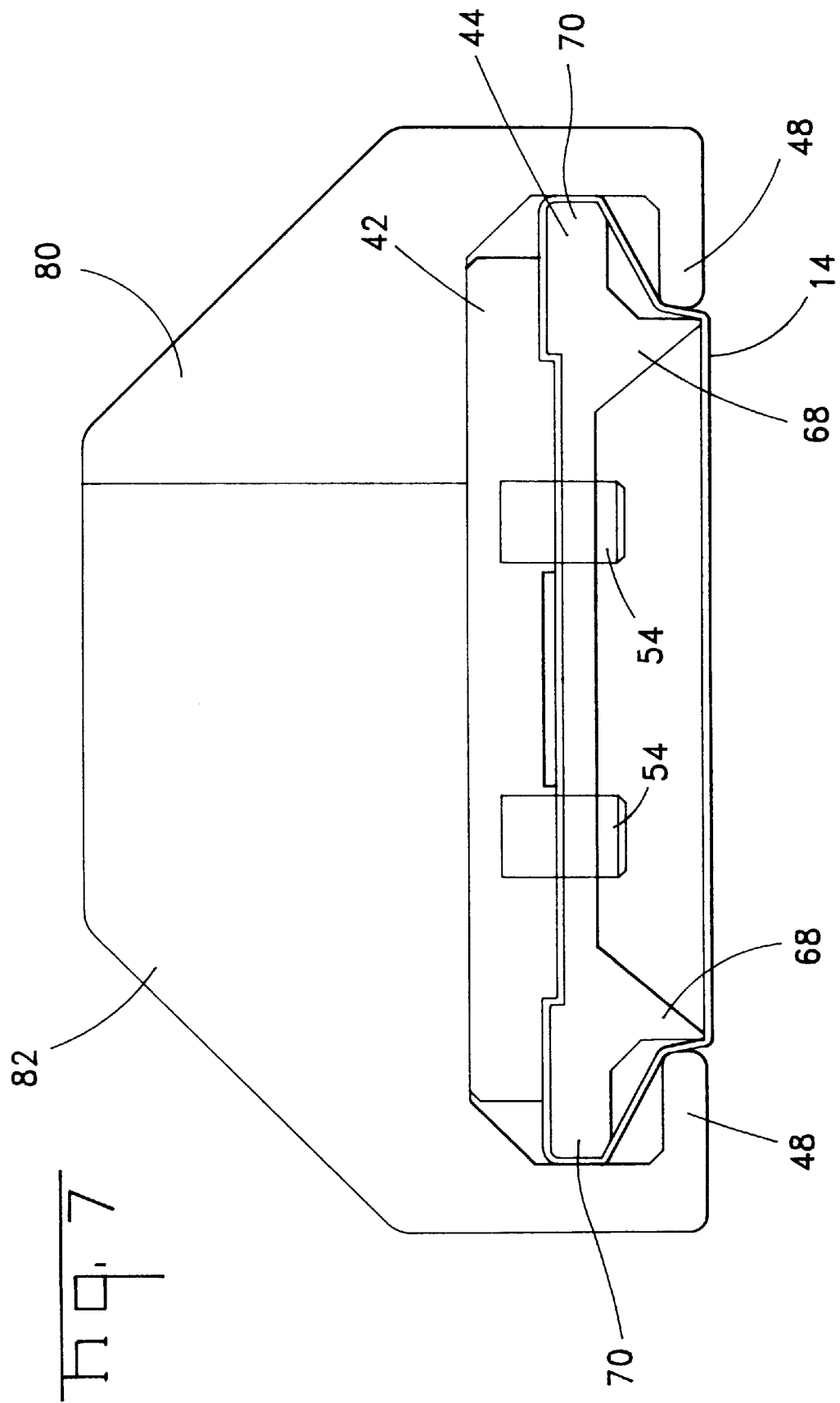

FILM TENSIONING APPARATUS

BACKGROUND OF THE INVENTION

1. Field of the Invention

This invention relates generally to acoustic sensors, and, more particularly, to a apparatus for tensioning a piezoelectric film of an acoustic sensor.

2. Description of the Related Art

Acoustic or vibration sensors may be used in a variety of applications, such as automotive, medical, airline, oil and gas exploration, etc. These applications require that the sensors be able to detect vibrations that range from very high g-forces to very small or nano-vibrations. Sensors needed to detect nano-vibrations must be extremely sensitive, and, thus, are prone to miscalibration. That is, since the vibration being detected is so small, even a slight variation in the detected magnitude of the vibration can severely impact the accuracy of the response signal.

Some acoustic or vibration sensors have a sensing element suspended by a tensioned element so that they are free for limited movement when exposed to a vibration. Thus, when the sensor experiences vibrations, the sensing element moves by an amount, and at a frequency, directly proportional to the tension. Movement of the sensing element causes it to produce an electrical signal corresponding to the magnitude and frequency of the movement. Variations in the tension can severely impact the movement of the sensing element, and, thus, the electrical signals produced. That is, greater tension may reduce movement of the sensing element, and less tension may increase the movement of the sensing element.

If a plurality of the vibration sensors are disposed in an array, so that they are exposed to the same vibration, they should produce signals indicative of their position relative to the source of the vibration. That is, sensors closer to the vibration source should experience a larger vibration and produce a larger signal. However, if the tension varies among the sensors in the array, then sensors that are remote from the vibration source may produce a larger signal than sensors that are proximate the vibration source. Thus, variations in tension among vibration sensors in an array can greatly influence the accuracy of or invalidate information about the location, magnitude, and type of vibration experienced by the sensor array.

The present invention is directed to overcoming, or at least reducing the effects of, one or more of the problems set forth above.

SUMMARY OF THE INVENTION

In one aspect of the present invention, a sensor is provided. The sensor includes a body, a base, and a film. The body has a recess formed therein with at least one lug extending at least partially across the recess. The base is positioned within the recess and has at least one protrusion extending from the base adjacent the lug. The film extends about the base and over the protrusion to form a space between a portion of the base and the film. The film is engaged with the lug and urged at least partially into the space.

In another aspect of the present invention, a sensor array is provided. The sensor array includes a film and a plurality of sensors. Each sensor includes a body with a recess formed therein and at least one lug extending at least partially across the recess. A base is positioned within the recess and has at least one protrusion extending from the base adjacent the lug. The film extends through the longitudinal recess of each of the plurality of sensors and about the base and over the protrusion to form a space between a portion of the base and the film of each sensor. The film is engaged with the lug and urged at least partially into the space.

BRIEF DESCRIPTION OF THE DRAWINGS

The invention may be understood by reference to the following description taken in conjunction with the accompanying drawings, in which like reference numerals identify like elements, and in which:

FIG. 7 illustrates a cross-sectional view of the sensor of FIG. 6.

Figure 1:
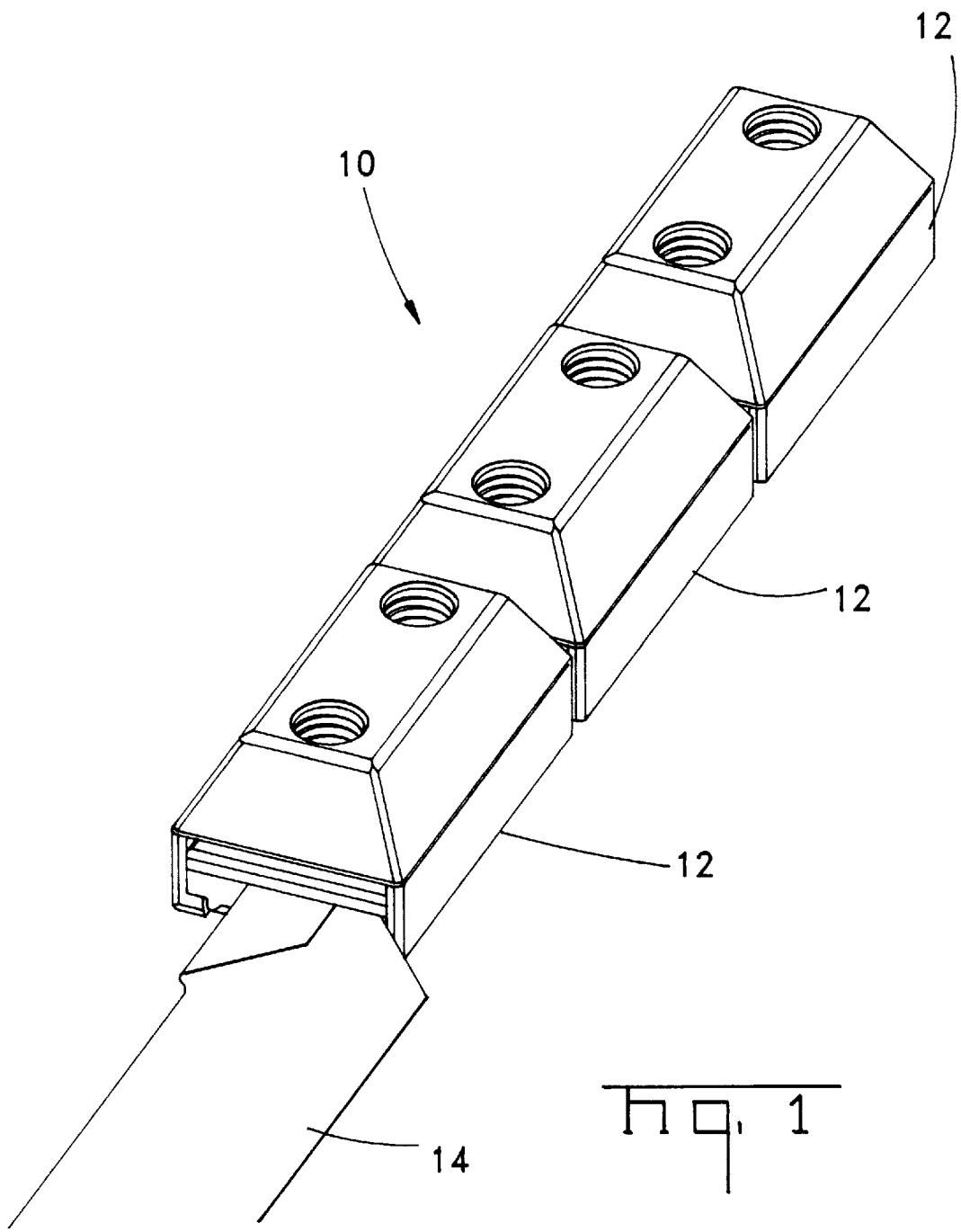
FIG. 1 illustrates a top perspective view of a sensor array.

While the invention is susceptible to various modifications and alternative forms, specific embodiments have been shown by way of example in the drawings and are described in detail. It should be understood, however, that the description herein of specific embodiments is not intended to limit the invention to the particular forms disclosed. On the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and in particular, to FIG. 1, a top perspective view of a sensor array 10 is shown. A plurality of sensors 12 are coupled together on a piezoelectric film 14. In the illustrated embodiment, the sensor array 10 is shown with three sensors 12; however, it is envisioned that more or fewer sensors 12 may be employed, as are useful in a particular application. The sensor array 10 may be employed in a variety of applications, and is useful in detecting acoustic vibrations, such as in echocardiograph stenography. That is, the sensor array 10 may be positioned adjacent the chest area of a patient and used to acoustically detect turbulent blood flow, which may be indicative of the presence of a blood clot.

Figure 2:
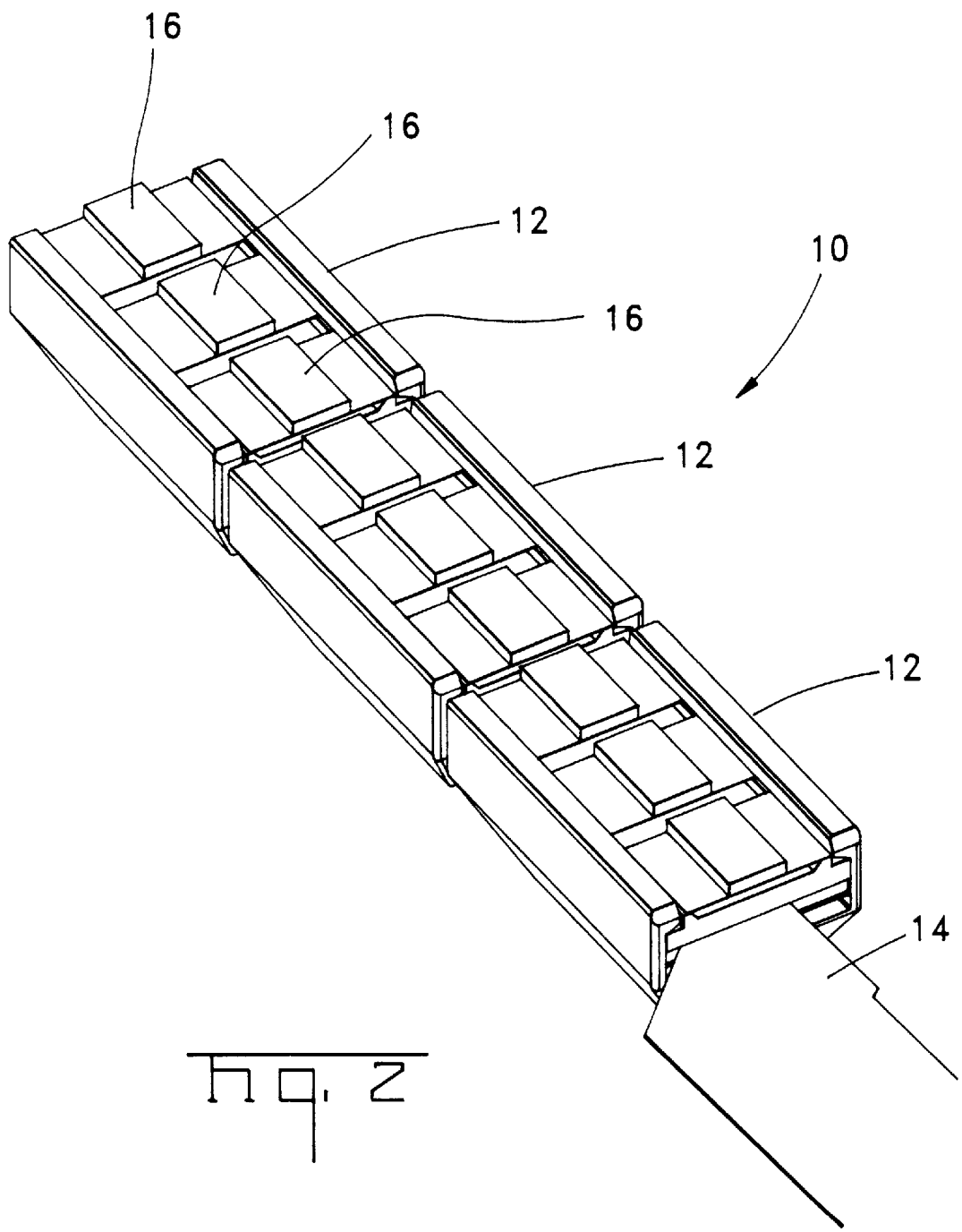
FIG. 2 illustrates a bottom perspective view of the sensor array.

FIG. 2 illustrates a bottom perspective view of the sensor array 10. The bottom view reveals that the piezoelectric film 14 has a plurality of semiconductor sensing elements 16 positioned thereon such that they are adjacent the patient's body when the sensor array 10 is positioned on the patient. The semiconductor sensing elements 16 are conventional acoustic sensors that produce an electrical signal in proportion to the magnitude and/or frequency of any vibration to which they are exposed. In the illustrated embodiment, each sensor 12 is shown having three semiconductor sensing elements 16; however, it is envisioned that more or fewer sensor elements 16 may be employed, as are useful in a particular application.

Figure 3:
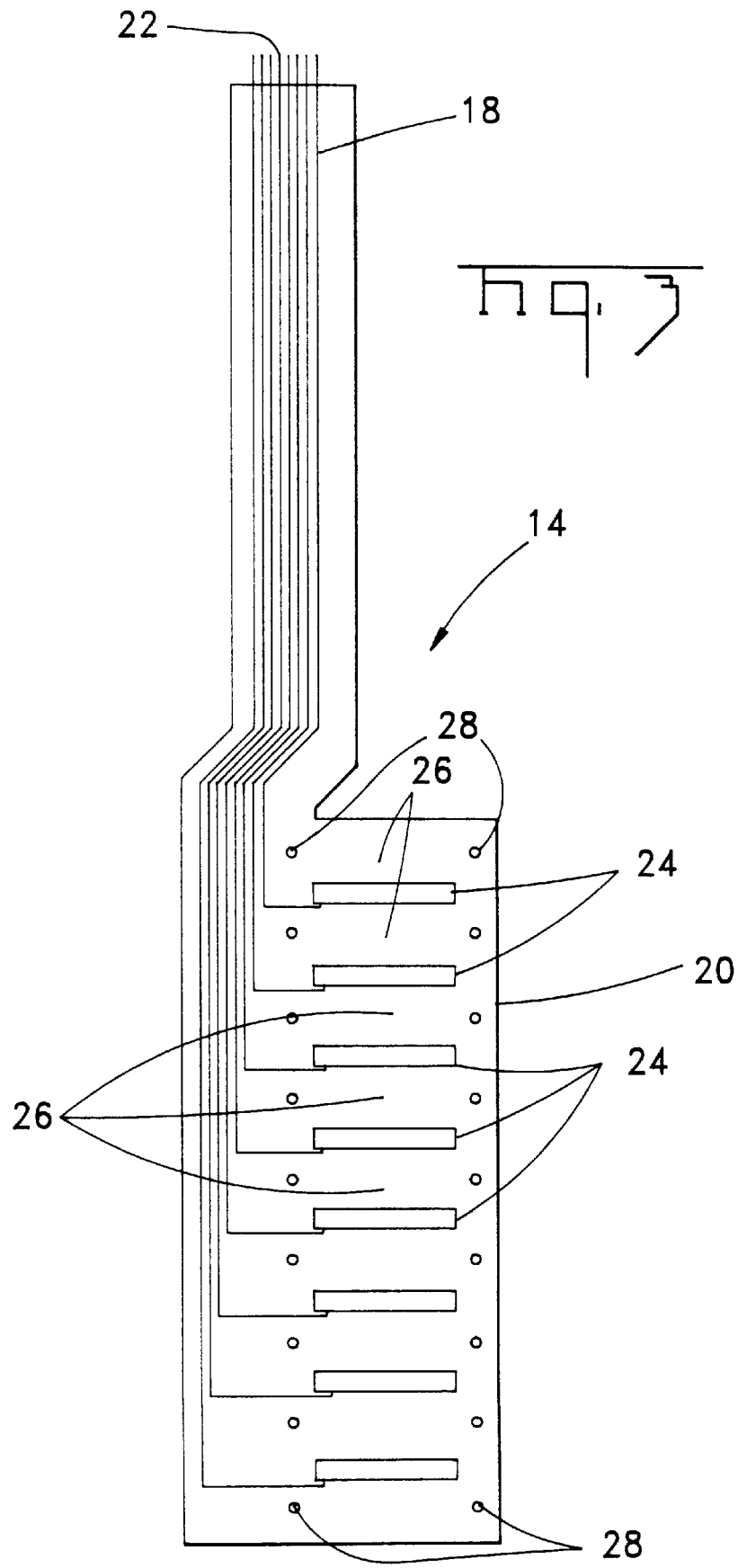
FIG. 3 illustrates a top view of a piezoelectric film of the sensor array of FIGS. 1 and 2.

Referring now to FIG. 3, a top view of the piezoelectric film 14 is shown. The film 14 includes a first and second end portion 18, 20, respectively. The first end portion 18 may be coupled to an electrical control system (not shown), and contains a plurality of electrical conductors 22 that electrically interconnect with the semiconductor sensing elements 16 located on the second end portion 20. Thus, electrical signals generated by the sensing elements 16 are communicated over the electrical conductors 22 to the control system (not shown) for recording and/or evaluation, or as control signals. The film 14 is shown in FIG. 3 without the semiconductor sensing elements 16. The sensing elements 16 may be coupled to the film 14 by any of a variety of conventional methodologies, such as by adhesive.

A plurality of slots 24 are formed through the film 14. The slots 24 may be of any configuration and, in one illustrated embodiment, are rectangular. The slots 24 divide the film into a plurality of substantially isolated regions 26 on which the sensing elements 16 are to be mounted. In the illustrated embodiment, eight slots 24 divide the film into nine regions 26 on which the nine sensing elements 16 are to be mounted. Isolating the regions 26 from each other helps to ensure that vibrations experienced by one sensing element 16 do not affect its neighboring sensing elements 16. That is, each sensing element 16 is intended to sense only local vibrations adjacent its location.

A pair of openings 28 are formed through the film 14 adjacent each region 26, and are used in locating and mounting the sensors 12 on the film 14. As discussed in greater detail below in conjunction with FIG. 5, the openings 28 interact with locating pins within the sensors 12 to fix the film 14 relative to the sensors 12.

Figure 4:
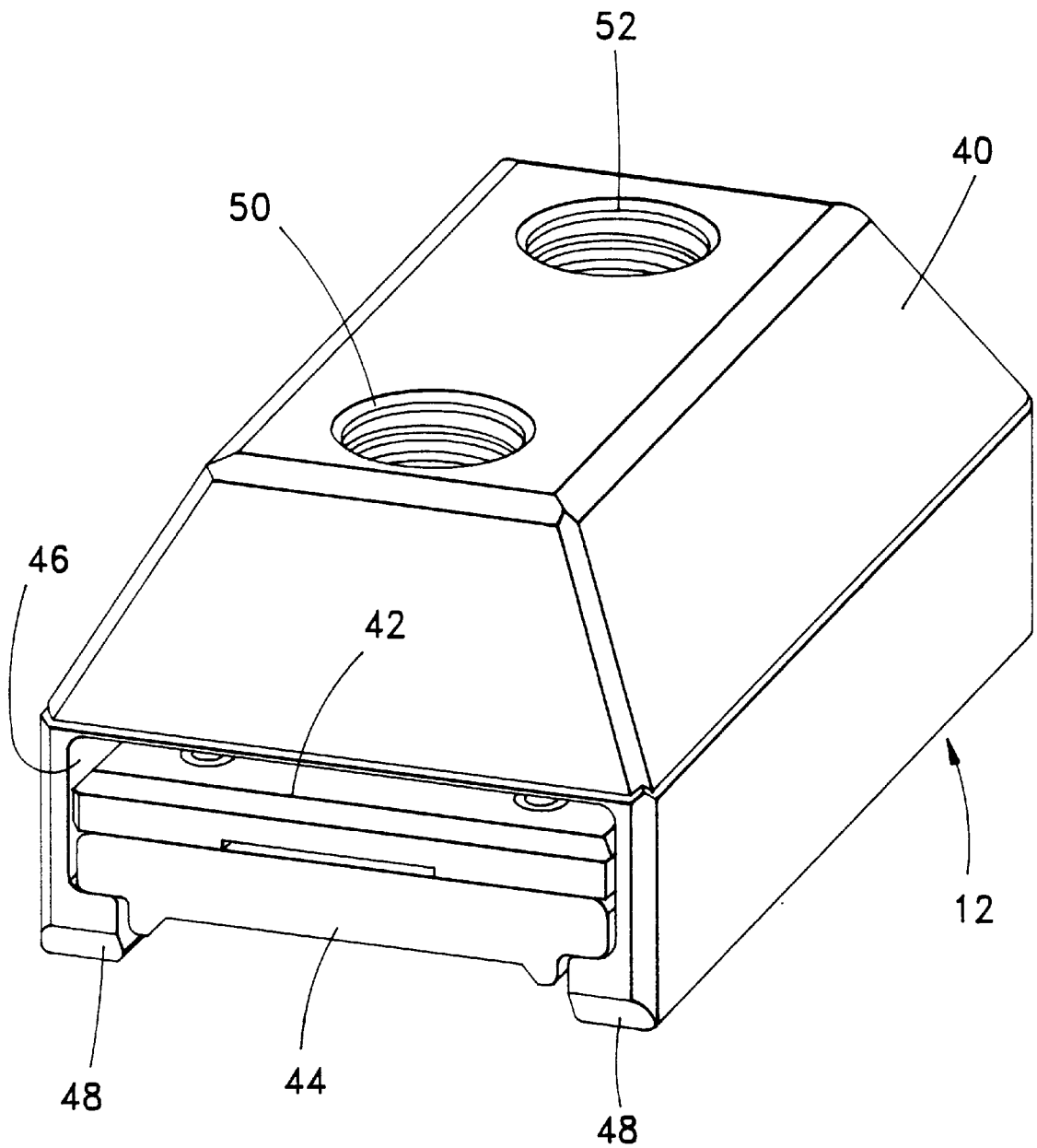
FIG. 4 illustrates a perspective view of a sensor of the sensor array of FIGS. 1 and 2.

Referring now to FIG. 4, a perspective view of a first illustrative embodiment of the sensor 12 is shown. The sensor 12 is comprised of a body 40, a spacer 42, and a base 44. In the illustrated embodiment, the body 40 is a one-piece construction formed using any of a variety of methodologies, such as casting, injection forming, milling, etc. In the illustrated embodiment, the body 40 is formed of a metal, such as zinc. An opening 46 is formed in the body 40, extending longitudinally therethrough with inwardly facing lugs 48 adjacent the bottom surface of the body 40. The lugs 48 capture the spacer 42 and base 44 within the longitudinal opening 46 to restrict the spacer 42 and base 44 against substantial movement, except longitudinal movement. The spacer 42 and base 44 are urged in a direction toward the lugs 48 by a pair of set screws (not shown) engaged in corresponding threaded openings 50, 52. The sensor 12 is shown only partially assembled. That is, the film 14 is not included in the illustration of FIG. 4, but is shown in the cross-sectional drawing of FIG. 5.

Figure 5:
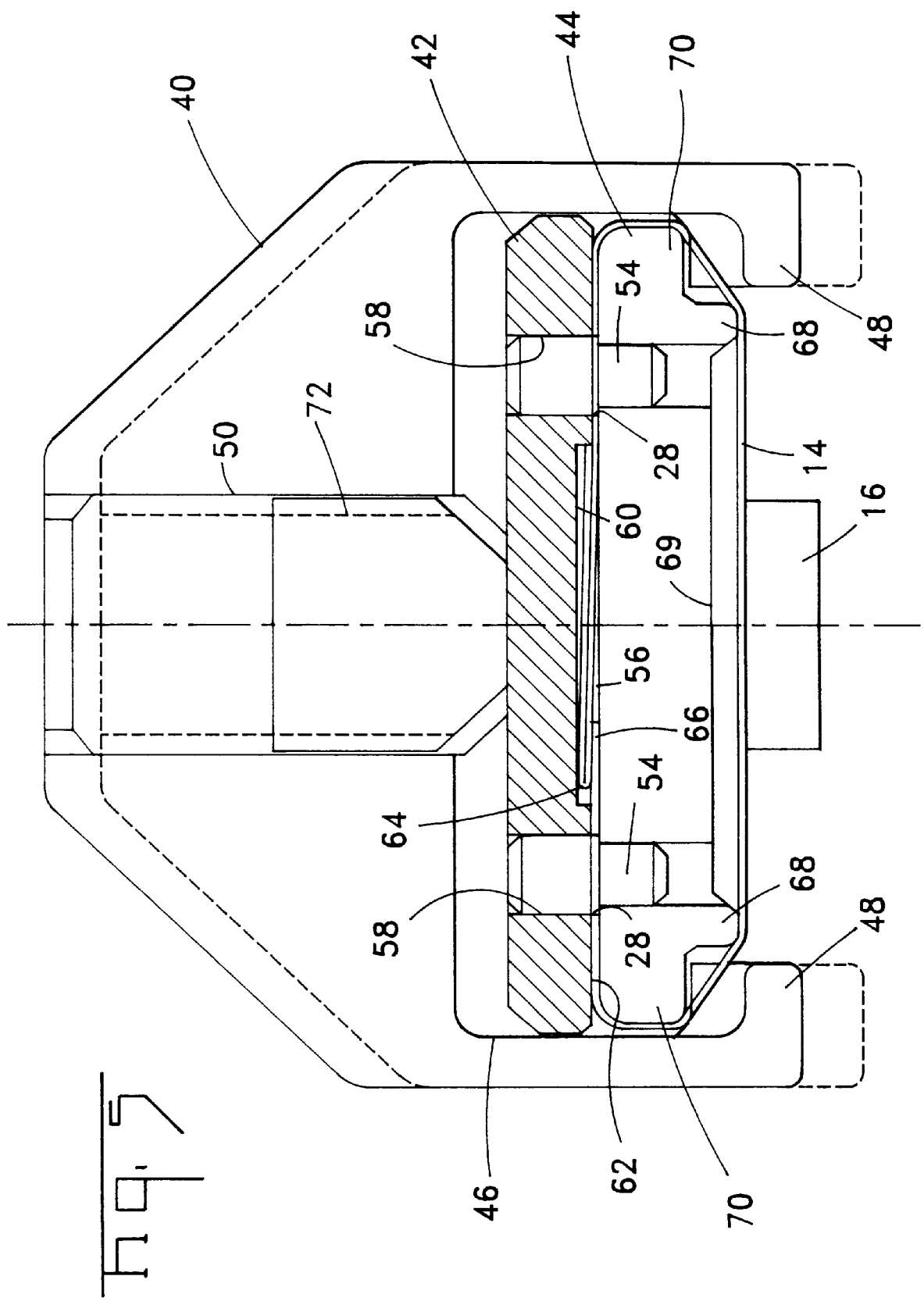
FIG. 5 illustrates a cross-sectional view of the sensor of FIGS. 1, 2, and 4.

Referring now to FIG. 5, the film 14 is shown with its second end portion 20 wrapped into a flattened tube shape about the perimeter of the base 44. The openings 28 in the film 14 extend around a pair of pins 54 extending from an upper surface 56 of the base 44. The spacer 42 has a pair of openings 58 that engage the pins 54 to form a unit with the base 44 and film 14, capturing the film 14 against removal from the pins 54. A recess 60 is formed in a lower surface 62 of the spacer 42 to receive overlapping end portions 64, 66 of the film 14. A pair of protrusions 68 extend from a lower surface 69 of the base 44. The protrusions 68 cause the film 14 to extend angularly from its end portions 70, spaced from the base 44.

Pressing the film 14 into the space formed between the end portions 70 and the protrusions 68 increases tension in the film 14. Thus, the tension in the film 14 can be controlled or adjusted by adjusting the set screw 72 in the openings 50, 52. That is, screwing the set screws 72 into the body 40 presses against the spacer 42, which urges the base 44 and film 14 against the lugs 48.

Figure 6:
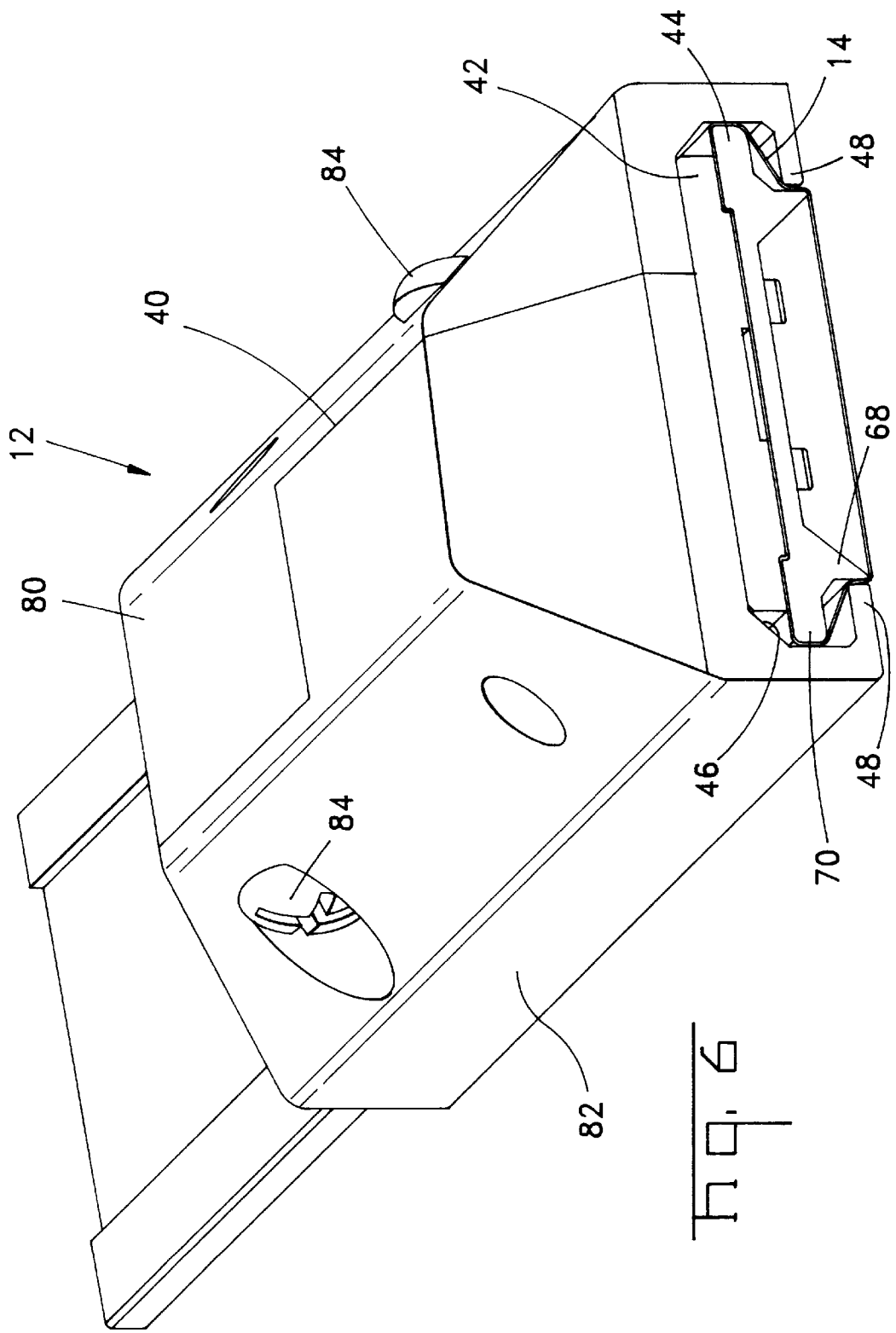
FIG. 6 illustrates a perspective view of an alternative embodiment of the sensor array of FIGS. 1 and 2.

FIG. 6 illustrates a perspective view of an alternative embodiment of the sensor 12. In this embodiment of the sensor 12, the body 40 is formed from a pair of symmetric halves 80, 82. The halves 80, 82 are joined together by any of a variety of mechanisms, including screws 84. The body 40 of this embodiment is assembled onto the spacer 42, base 44, and film 14 by joining together the symmetric halves 80, 82. The depth of the opening 46 relative to the lugs 48 controls tension in the film 14. That is, during the manufacture of the symmetric halves 80, 82 the recess 46 is machined, formed, etc. to a depth that corresponds to the assembled height of the spacer 42, base 44, and film 14 minus the magnitude of the intrusion of the lugs 48 to provide the desired tension in the film 14. As the halves 80, 82 are urged together, the lugs 48 engage the film 14, pressing it into the space between the end portion 70 and the protrusion 68, thereby tensioning the film 14 to its desired level. The tension in the film 14 may also be adjusted by controlling the length of the lugs 48. Shortening the lugs 48 reduces the amount of intrusion into the space between the end portion 70 and the protrusion 68, and thus the tension.

Referring now to FIG. 7, the film 14 is shown with its second end portion 20 wrapped into a flattened tube shape about the perimeter of the base 44. The assembly and construction of the spacer 42, the base 44, and the film 14 are substantially similar to that in the embodiment described in FIGS. 1–5.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A sensor, comprising:
   a body having a longitudinal recess formed therein and at least one lug extending at least partially across said recess;
   a base positioned within said recess and having at least one protrusion extending from said base adjacent said lug; and
   a film extending about said base and over said protrusion to form a space between a portion of said base and said film, said film being engaged with said lug and urged at least partially into said space.

2. A sensor, as set forth in claim 1, wherein said body includes first and second lugs positioned on opposite sides of said recess, each of said lugs extending at least partially across said recess.

3. A sensor, as set forth in claim 2, wherein said base includes first and second protrusions extending from said base adjacent said first and second lugs, respectively, and said film extends about said base and over said first and second protrusions to form a first and second space between a portion of said base and said film, said film being engaged with said first and second lugs and urged at least partially into said first and second spaces.

4. A sensor, as set forth in claim 1, wherein said film includes a first and second opening formed therein, and said base has at least one post extending therefrom and engaged with said film openings.

5. A sensor, as set forth in claim 4, including a spacer positioned intermediate said base and a bottom surface of the longitudinal recess, said spacer having at least one opening formed therein to engage the post of said base and capture the film between the spacer and the base.

6. A sensor, as set forth in claim 1, wherein said body has a bore formed therein extending from a bottom surface of said longitudinal recess through a top surface of said body, said bore being threaded to receive a screw therein.

7. A sensor, as set forth in claim 1, wherein said body includes first and second longitudinal halves joined together by a fastener.

8. A sensor, as set forth in claim 7, wherein the first and second longitudinal halves are substantially identical.

9. A sensor, comprising:
   a body having a generally C-shaped cross-sectional configuration, said C-shaped cross-section having first and second end portions;
   a base positioned within said body and having at least one protrusion extending from said base intermediate the end portions of the C-shaped cross section; and
   a film extending about said base and over said protrusion to form a space between a portion of said base and said film, said film being engaged with the end portions of the C-shaped cross-section and urged at least partially into said space.

10. A sensor, as set forth in claim 9, wherein said base includes first and second protrusions extending from said base adjacent the first and second end portions of the C-shaped cross-section, and said film extends about said base and over said first and second protrusions to form first and second spaces between a portion of said base and said film, said film being engaged with the end portions of the C-shaped cross-section and urged at least partially into said first and second spaces.

11. A sensor, as set forth in claim 9, wherein said film includes a first and second opening formed therein, and said base has at least one post extending therefrom and engaged with said film openings.

12. A sensor, as set forth in claim 11, including a spacer positioned intermediate said base and the interior of said C-shaped cross-section, said spacer having at least one opening formed therein to engage the post of said base and capture the film between the spacer and the base.

13. A sensor, as set forth in claim 9, wherein said body has a bore formed therein extending between the interior and exterior surfaces, said bore being threaded to receive a screw therein.

14. A sensor, as set forth in claim 9, wherein said body includes first and second longitudinal halves joined together by a fastener.

15. A sensor, as set forth in claim 7, wherein the first and second longitudinal halves are substantially identical.

16. A sensor array, comprising:
   a film, and
   a plurality of sensors, each comprising:
      a body having a recess formed therein and at least one lug extending at least partially across said recess; and
      a base positioned within said recess and having at least one protrusion extending from said base adjacent said lug;
   said film extending through the longitudinal recess of each of said plurality of sensors and about said base and over said protrusion to form a space between a portion of said base and said film of each sensor, said film being engaged with said lug and urged at least partially into said space.

17. A sensor array, as set forth in claim 16, wherein said body includes first and second lugs positioned on opposite sides of said longitudinal recess and extending at least partially across said recess adjacent an exterior surface of said body.

18. A sensor array, as set forth in claim 17, wherein said base includes first and second protrusions extending from said base adjacent said first and second lugs, respectively, and said film extends about said base and over said first and second protrusions to form a first and second space between a portion of said base and said film, said film being engaged with said first and second lugs and urged at least partially into said first and second spaces.

19. A sensor array, as set forth in claim 16, wherein said film includes a first and second opening formed therein, and said base has at least one post extending therefrom and engaged with said film openings.

20. A sensor, as set forth in claim 19, including a spacer positioned intermediate said base and a bottom surface of the longitudinal recess, said spacer having at least one opening formed therein to engage the post of said base and capture the film between the spacer and the base.

21. A sensor, as set forth in claim 16, wherein said body has a bore formed therein extending from a bottom surface of said longitudinal recess through a top surface of said body, said bore being threaded to receive a screw therein.

22. A sensor, as set forth in claim 16, wherein said body includes first and second longitudinal halves joined together by a fastener.

23. A sensor, as set forth in claim 22, wherein the first and second longitudinal halves are substantially identical.

\* \* \* \* \*